US009463492B2

(12) United States Patent
Roch

(10) Patent No.: US 9,463,492 B2
(45) Date of Patent: Oct. 11, 2016

(54) METHOD OF MERGING NON-MACHINE-SORTABLE POSTAL ARTICLES WITH MACHINE-SORTED MAIL PIECES

(71) Applicant: SOLYSTIC, Bagneux (FR)

(72) Inventor: Olivier Roch, Saint Georges les Bains (FR)

(73) Assignee: SOLYSTIC, Bagneux (FR)

(*) Notice: Subject to any disclaimer, the term of this patent is extended or adjusted under 35 U.S.C. 154(b) by 28 days.

(21) Appl. No.: 14/345,122

(22) PCT Filed: Jan. 13, 2014

(86) PCT No.: PCT/FR2014/050055
§ 371 (c)(1),
(2) Date: Mar. 14, 2014

(87) PCT Pub. No.: WO2014/122375
PCT Pub. Date: Aug. 14, 2014

(65) Prior Publication Data

US 2014/0222192 A1 Aug. 7, 2014

(30) Foreign Application Priority Data

Feb. 5, 2013 (FR) .................................... 13 50977

(51) Int. Cl.
*G06F 7/00* (2006.01)
*B07C 3/00* (2006.01)
*B65H 39/02* (2006.01)

(52) U.S. Cl.
CPC ................ *B07C 3/00* (2013.01); *B65H 39/02* (2013.01); *B07C 2301/0083* (2013.01); *B65H 2701/18267* (2013.01); *B65H 2701/18269* (2013.01); *B65H 2701/1916* (2013.01)

(58) Field of Classification Search
USPC ........................................................ 700/223
See application file for complete search history.

(56) References Cited

FOREIGN PATENT DOCUMENTS

| | | | | |
|---|---|---|---|---|
| DE | EP 2338615 A1 * | 6/2011 | .............. | B07C 3/00 |
| DE | 10 2010 043 389 | 5/2012 | | |
| EP | 2 338 615 | 6/2011 | | |
| WO | WO 2012/059422 | 5/2012 | | |

OTHER PUBLICATIONS

Search Report from corresponding French Application No. 1350977 dated Oct. 4, 2013.

* cited by examiner

*Primary Examiner* — Kyle Logan
(74) *Attorney, Agent, or Firm* — Merchant & Gould P.C.

(57) ABSTRACT

A method of merging postal articles (11) for delivery together with mailpieces (2) sorted in a machine (1) into relevant delivery rounds, the method comprising the following steps:

entering data into the sorting machine that is representative of the delivery addresses of the postal articles to be merged;

in the sorting machine, simulating an ordered sequence of mailpieces for delivery on the relevant delivery round, and, on the basis of said data, determining in this simulated sequence respective locations for said postal articles to be merged;

sorting said mailpieces into sorting outlets of the machine for delivery on relevant delivery rounds, and, while each mailpiece is being machine-sorted, detecting whether said mailpiece is a mailpiece adjacent to a postal article to be merged in said simulated sequence; and responding to each said detection by inserting a separator (10) into the sorting machine so as to direct it automatically towards the sorting outlet of the machine that corresponds to the delivery address of said postal article.

1 Claim, 2 Drawing Sheets

METHOD OF MERGING NON-MACHINE-SORTABLE POSTAL ARTICLES WITH MACHINE-SORTED MAIL PIECES

This application is a National Stage Application of PCT/FR2014/050055, filed 13 Jan. 2014, which claims benefit of Serial No. 1350977, filed 5 Feb. 2013 in France and which applications are incorporated herein by reference. To the extent appropriate, a claim of priority is made to each of the above disclosed applications.

TECHNICAL FIELD

The invention relates to the field of postal sorting. The invention relates more particularly to a method of merging postal articles with already machine-sorted mailpieces so as to merge them into relevant delivery rounds. Such postal articles are particularly but not exclusively postal articles that are not machine sortable, such as parcels or the like. Such postal articles may also come from a postal sorting line that is different from the sorting line for sorting the mailpieces.

PRIOR ART

Postal sorting machines and methods used for preparing delivery rounds or "postman's walks" can be fully automatic, without any human intervention, or else they can include steps in which it is necessary for an operator to intervene, in particular for handling non-machine-sortable postal articles.

On that subject, a method of merging non-machine-sortable postal articles with machine-sorted mail is already known from Patent Document DE 10 2010 043 389. In that known method, merging assistance is given to the operator in charge of performing the merging. That operator assistance consists in displaying on a display screen placed next to the operator the image of a reference mailpiece that should precede or that should follow the postal article to be merged, in the ordered sequence of the mailpieces. For that purpose, a camera is used to take a digital image of the postal article to be merged, and said reference mailpiece is determined on the basis of the mailpiece data produced in the sorting machine during the preceding sorting passes performed on the mailpieces, and also on the basis of a sorting plan that corresponds to the ordering of said mailpieces in the sequence. Then the operator scans through the sequence of mailpieces until said operator visually identifies the reference mailpiece, whereupon said operator can insert the postal article at the right place in the ordered sequence of the mailpieces.

The volume of mail that is sorted automatically by machine is increasing relative to the volume of postal articles to be merged manually because sorting equipment is ever-improving. As a result, this operation of manually scanning through the sequence of already-sorted mailpieces is becoming increasingly lengthy and tedious.

Currently, such manual merging is performed mainly in preparing delivery rounds in inward delivery post offices. In practice, it is the delivery person who performs the merging because of that person's knowledge of the delivery plan for the mailpieces. There exists a need to transfer this task to a non-specialized operator who has no real knowledge of the delivery plans in order to reduce the costs of that manual operation.

An object of the invention is thus to remedy the drawbacks and to satisfy the expectations indicated above.

SUMMARY OF THE INVENTION

The invention therefore provides a method of merging postal articles for delivery together with mailpieces sorted in a machine into relevant delivery rounds, the method comprising the following steps:

- entering data into the sorting machine that is representative of the delivery addresses of the postal articles to be merged;
- in the sorting machine, simulating an ordered sequence of mailpieces for delivery on the relevant delivery round, and, on the basis of said data, determining in this simulated sequence respective locations for said postal articles to be merged;
- sorting said mailpieces into sorting outlets of the machine for delivery on relevant delivery rounds, and, while each mailpiece is being machine-sorted, detecting whether said mailpiece is a mailpiece adjacent to a postal article to be merged in said simulated sequence; and
- responding to each said detection by inserting a separator into the sorting machine so as to direct it automatically towards the sorting outlet of the machine that corresponds to the delivery address of said postal article.

The basic idea of the invention is thus to insert separators during the last sorting pass of the mailpieces at determined locations among said mailpieces. Merging the postal articles then consists merely in putting each postal article in the place of a respective separator in the ordered sequence of the mailpieces.

BRIEF DESCRIPTION OF THE DRAWINGS

The present invention can be better understood and other advantages appear on reading the following description and on examining the accompanying drawings, in which.

DESCRIPTION OF AN IMPLEMENTATION

Figure 1:
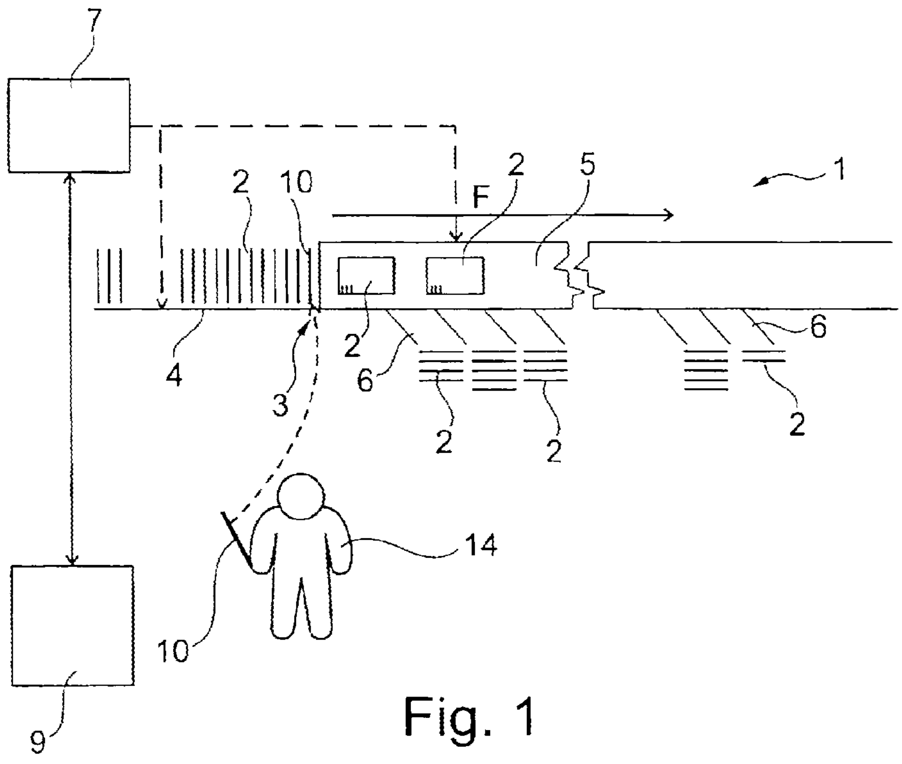
FIG. 1 shows a postal sorting machine in which the method of the invention is implemented.

FIG. 1 is a very diagrammatic view of a postal sorting machine 1 with mailpieces 2 of the following types: letters; magazines; or other machine-sortable flat postal articles or "flats".

In conventional manner, the sorting machine 1 has a feed inlet with an unstacker 3 provided with a feed magazine 4, and a sorting conveyor 5 downstream from the unstacker and along which the unstacked mailpieces 2 are moved, on edge and in series in this example, towards sorting outlets 6.

It is understood that the sorting conveyor 5 is equipped with conventional peripherals for identifying each unstacked mailpiece, e.g. a bar code reader or a camera for taking a digital image of each mailpiece in order to extract the unique identifier of the mailpiece in the form of an image signature, for example.

The sorting machine 1 also has a monitoring & control and data-processing unit 7 that controls the unstacker 3 and the sorting conveyor 5 in such a manner as to direct and to sort the unstacked mailpieces 2 into the sorting outlets 6 on the basis of a certain sorting plan.

As is well known, during a first sorting pass, the delivery addresses that are recognized on the mailpieces 2 on the basis of the images of the mailpieces are stored in a database indicated by 9 in FIG. 1, the data in the database including, for example and for each mailpiece, a unique identifier of the mailpiece, an image of the delivery address block for the mailpiece, and an indication of the delivery point corresponding to said delivery address.

The delivery address data is thus normally available for the unit 7 and stored in the database 9 as from the first sorting pass. For putting the mailpieces in order in the relevant delivery round, two or more successive sorting passes are generally necessary. During the last sorting pass for sorting the mailpieces in the sorting machine 1 for delivery on the relevant delivery rounds, e.g. during the third sorting pass, it is therefore certain that said address data for the mailpieces will already be known by the unit 7.

In accordance with the invention, for merging postal articles for delivery together with a sequence of mailpieces 2 that have already been put into an ordered sequence by a machine into the relevant delivery rounds, separators are inserted during the last sorting pass of the mailpieces in the sorting machine 1, at the locations in the sequence that correspond to the delivery addresses of said postal articles to be merged in the order that corresponds to the delivery on the relevant delivery round.

Such separators, inserted automatically in this way among the mailpieces that are already in their ordered sequence, thus enables the operator to perform the merging merely by replacing the separators with the postal articles.

Figure 2:
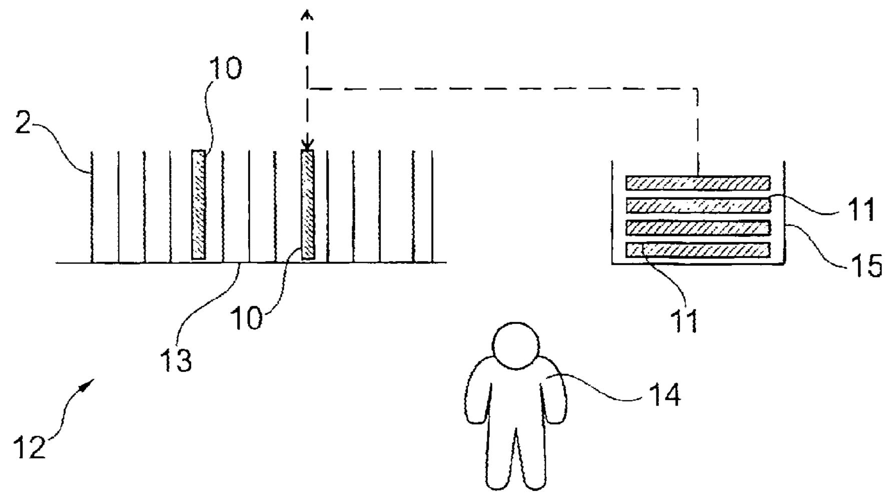
FIG. 2 shows more specifically how the postal articles are merged among the already-sorted mailpieces.

Said separators 10 are shown in FIG. 2 as inserted among the mailpieces 2 that are already in the ordered sequence of the relevant delivery round.

In accordance with the invention, said separators 10 are sorted and directed automatically through the sorting conveyor 5 into the sorting outlets 6 among the sorted mailpieces 2 during the last sorting pass.

Said separators are thus flat separators that can pass along the sorting conveyor 5.

In accordance with the invention, each separator is inserted into the flow F of mailpieces between the unstacker and the sorting outlets, and it is possible for the insertion of each separator into the sorting conveyor 5 to be performed by placing the separator in a feed slot of the mailpiece unstacker in front of the stack of mailpieces stored in the magazine of the unstacker, or indeed, for example, from another unstacker (not shown) connected to the sorting conveyor 5 in parallel with the unstacker 3, said other unstacker being loaded with separators 10. It should be understood that there are as many separators 10 as there are postal articles to be merged.

In accordance with the invention, before the mailpieces undergo the last machine sorting pass, the unit 7 of the machine must identify the postal articles that are to be merged with the mailpieces. For this purpose, the operator may, for example, identify each postal article by means of a camera (not shown) so as to take a digital image of the delivery address block on the article in question. On the basis of said digital image, the unit 7 can recognize the delivery address by optical character recognition (OCR), and store this data in the database 9. When all of the postal articles to be inserted have thus been identified, the unit 7 can start sorting the mailpieces using the method of the invention.

Prior to the last sorting pass of the mailpieces, the postal articles to be merged may also be put through a postal sorting machine capable of conveying them and that is equipped with a camera that takes digital images of the delivery address blocks and sends them to OCR equipment for recognizing the delivery address of each postal article, that data then being stored in the database 9.

Figure 3:
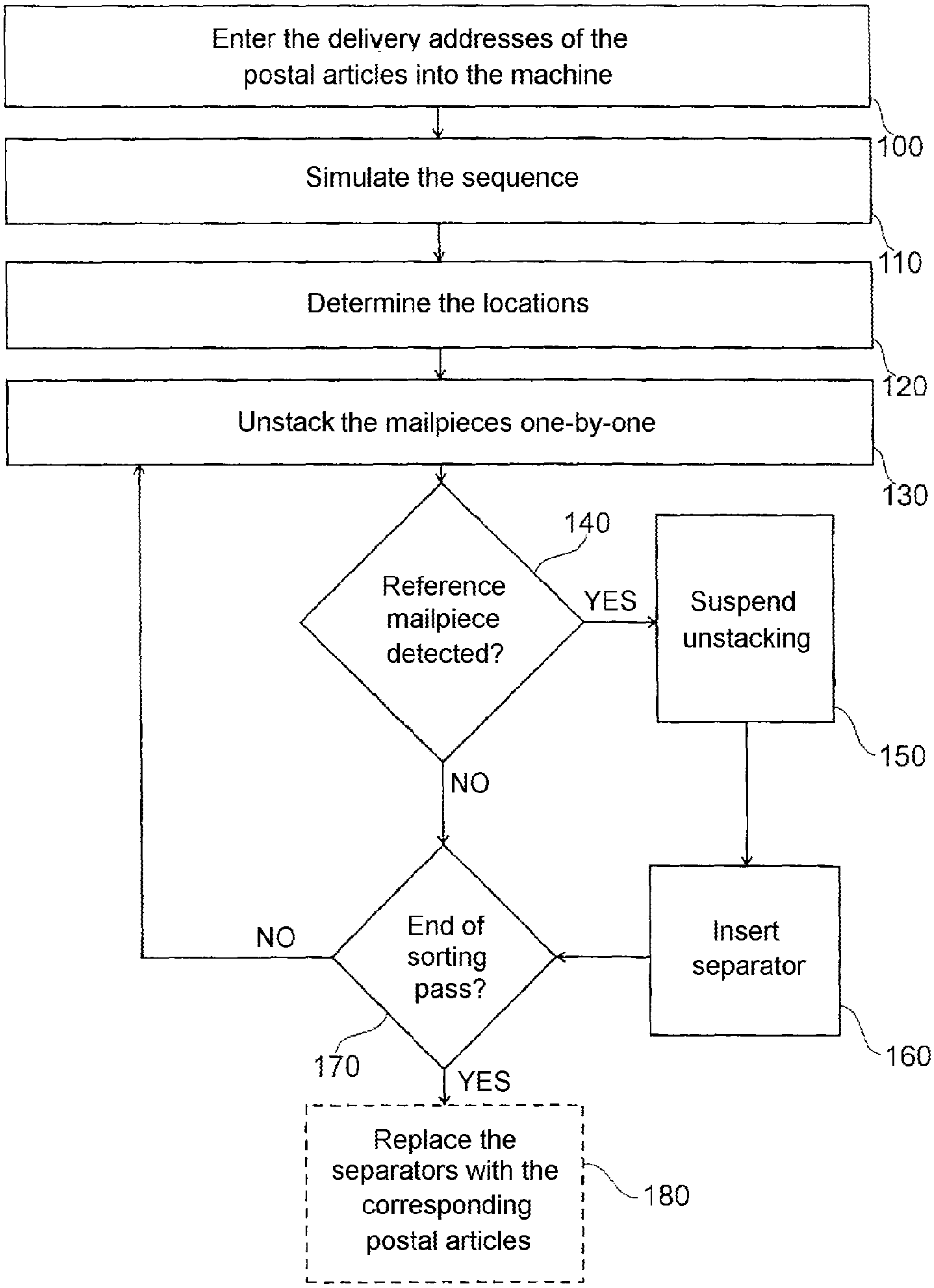
FIG. 3 is a flow chart showing the main steps of the method of the invention.

FIG. 3 shows the main steps of the method of the invention for inserting the separators 10 among the mailpieces 2 during the last sorting pass.

The mailpieces 2 to be sorted in a last sorting pass for delivery on the relevant delivery rounds are stacked on edge, e.g. in the magazine 4 of the unstacker of the sorting machine.

The postal delivery addresses of the mailpieces 2 are already stored in the database 9 because they are entered in said database during the first sorting pass of said mailpieces.

In accordance with the invention, in step 100, the operator enters into the sorting machine the postal delivery addresses of the postal articles 11 to be merged that are shown in FIG. 2 in a container 15. Said postal articles 11 may thus be non-machine-sortable parcels, or else mailpieces that have been rejected from machine sorting, e.g. because their delivery addresses are illegible.

Said address data is thus available in the sorting machine before the last sorting pass of the mailpieces 2 for sorting them into the relevant delivery rounds.

These addresses may be entered in various different manners: the postal article images containing the delivery addresses may be entered, and then recognized automatically by OCR in the monitoring & control unit;

the addresses of the postal articles may be entered directly on a keyboard; a bar code encoding each delivery address of a postal article may be read, etc.

In the unit 7, in step 110, an ordered sequence of the mailpieces 2 is simulated for delivery on the relevant delivery round, this simulation being performed on the basis of the address data recorded in the database 9. This virtual sequence may be seen in the memory of the sorting machine as an ordered list of the identifiers of the mailpieces, for example.

On the basis of this virtual sequence of the mailpieces and on the basis of the delivery address data of the postal articles 11 to be merged, the unit 7 is suitable for determining at 120 the locations for insertion into the sequence that correspond to the postal articles to be merged for delivering them together with the mailpieces 2 on the relevant delivery round.

Then, the unit 7 is suitable for identifying a reference mailpiece in the sequence for each determined location, the reference mailpiece being the mailpiece that is adjacent to the mailpiece 11 to be merged, e.g. the mailpiece that precedes it in the real sequence 12 of the mailpieces that includes the merged postal articles.

When all of the reference mailpieces have been identified by the unit 7 on the basis of said simulated sequence, the process continues at 130 with unstacking of the mailpieces one-by-one at the inlet of the sorting machine.

In the method of the invention, each time a current mailpiece is unstacked, the unit 7 checks at 140 whether said mailpiece is a reference mailpiece, and if it is detected that it is indeed a reference mailpiece, said unit suspends the unstacking at 150.

A separator 10 is then, at 160, fed into the sorting conveyor 5 so as to be inserted into the flow F of the mailpieces 2, e.g. via a separator unstacker, as indicated above, and the sorting conveyor 5 directs said separator 10 into a sorting outlet 6 that corresponds to the delivery address of the corresponding postal article 11 to be merged. The unstacker 3 of the mailpieces 2 can then start again.

The process thus continues in looped manner for each mailpiece until the end of the last sorting pass, which end is detected at 170.

At step 180, the operator 14 retrieves from the sorting outlets 6 the sorted mailpieces 2 together with the separators 10, and places them on the merge support surface 13, e.g. a work table, in a stack, on edge, and in the ordered sequence for delivery on the relevant delivery round.

The operator 14 then merely has to replace each separator 10 with a corresponding postal article 11 in order to obtain an ordered sequence in which the mailpieces 2 and the postal articles 11 are merged.

It is understood that, during merging by the operator 14, the postal articles 11 may themselves be put into the ordered sequence of the relevant delivery round in the container shown in FIG. 2, thereby further simplifying the work of the operator 14.

It is also possible to consider using separators 10 that are each provided with visual identification means that are activatable remotely, e.g. a light-emitting diode (LED), on the basis of codes associated respectively with the postal articles, emission of the code of a postal article causing activation of the LED of the corresponding separator 10.

Naturally, the present invention is in no way limited to the above description of one of its implementations, which can undergo modifications without going beyond the ambit of the invention.

The invention claimed is:

1. A method of merging postal articles for delivery together with mailpieces sorted in a machine into relevant delivery rounds, the method comprising the following steps:

entering data into the sorting machine that is representative of delivery addresses of the postal articles to be merged;

in the sorting machine, simulating an ordered sequence of mailpieces for delivery on the relevant delivery round, and, on the basis of said data, determining in the simulated sequence respective locations for said postal articles to be merged;

sorting said mailpieces into sorting outlets of the machine for delivery on relevant delivery rounds, and, while each mailpiece is being machine-sorted, detecting whether said mailpiece is a mailpiece adjacent to a postal article to be merged in said simulated sequence; and responding to each said detection by inserting a separator into the sorting machine so as to direct said separator automatically towards the sorting outlet of the machine that corresponds to the delivery address of said postal article;

at the end of the machine sorting of the mailpieces and of the separators, putting the postal articles in place of the separators to merge said postal articles with the mailpieces for delivery on the relevant delivery round; and activating each separator remotely and visually identifying the separator.

* * * * *